United States Patent [19]

Barringer et al.

[11] Patent Number: 4,512,822
[45] Date of Patent: Apr. 23, 1985

[54] NON-HYGROSCOPIC WELDING FLUX BINDERS

[75] Inventors: Eric A. Barringer, Waltham; Thomas W. Eagar, Belmont, both of Mass.

[73] Assignee: Massachusetts Institute of Technology, Cambridge, Mass.

[21] Appl. No.: 626,613

[22] Filed: Jun. 29, 1984

[51] Int. Cl.³ .............................................. B23K 35/34
[52] U.S. Cl. ...................................... 148/24; 148/23; 148/26
[58] Field of Search .................................... 148/23–26

[56] References Cited

U.S. PATENT DOCUMENTS 3,985,586 10/1976 Choby .................................. 148/23

*Primary Examiner*—Peter D. Rosenberg
*Attorney, Agent, or Firm*—Arthur A. Smith, Jr.; Patrea L. Pabst

[57] ABSTRACT

A welding flux binder is provided which comprises an alkali-alkaline earth silicate hydrolyzed and polymerized from tetraalkylorthosilicate, $Si(OR)_4$, wherein R is $-CH_3$, $-C_2H_5$, or $-C_3H_7$, and alkali and alkaline earth salts. The reaction product of the tetraalkylorthosilicate and metal salts, $M_2O.M'O.SiO_2$, where M is potassium, sodium or lithium, and M' is magnesium, calcium or barium, has several advantages as a welding flux binder. For example, it is not hygroscopic and can be prepared at low temperatures since the alkali ions lower the melting point for viscous sintering of the gel phase. Because of the low temperature processing, a wide variety of solid additives with low thermal stability, such as some metals, carbonates, and fluorides, can be incorporated into the flux. Other dopants may also be readily incorporated into the binder during the gel phase.

6 Claims, No Drawings

NON-HYGROSCOPIC WELDING FLUX BINDERS

BACKGROUND OF THE INVENTION

Arc welding is by far the most common welding process. The two main types of arc welding are submerged arc welding (SAW) and shielded metal arc welding (SMAW). In submerged arc welding, coalescence is produced by heating with an electric arc between a bare-metal electrode and the metal being worked. The welding is blanketed with a granular or fusible material or flux. The welding operation is started by striking an arc beneath the flux to produce heat to melt the surrounding flux so that it forms a subsurface conductive pool which is kept fluid by the continuous flow of current. The end of the electrode and the work piece directly below it become molten and molten filler metal is deposited from the electrode onto the work. The molten filler metal displaces the work and forms the weld. In shielded metal arc welding, shielding is by flux-coated electrodes or welding rods instead of a loose granular blanket of flux.

Fluxes are utilized in arc welding to control the arc stability, modify the weld metal composition, and provide protection from atmospheric contamination. Arc stability is controlled by modifying the composition of the flux. It is therefore desirable to have substances which function well as plasma charge carriers in the flux mixture. Fluxes also modify the weld metal composition by rendering impurities in the metal more easily fusible and providing substances which these impurities may combine with in preference to the metal to form slag. Practically all slag-forming compounds may be classed as either acidic or basic, according to which compounds they react with. The substances which are considered to be the most active "bases" are those which are compounds of the elements forming basic compounds in ordinary chemical reactions in water solutions, such as calcium, magnesium, and sodium. The most active "acid" impurities are compounds of silicon and phosphorous. Silicon dioxide ($SiO_2$) is the only substance used as a strictly acid flux. Fluxes are prepared with a higher or lower percentage of acidic or basic compounds, depending on the type of metal to be welded and impurities in the metal. In some instances, other materials may be added to lower the slag melting point and to improve slag fluidity, and to serve as binders for the flux particles.

It follows that any improvement in welding fluxes or flux binders is of benefit to the many industries which utilize arc welding.

A problem encountered in the welding industry is the absorption of moisture by the flux covering on welding electrodes. Most welding electrode flux formulations consist of an oxide-based material (flux) and additives bonded together by sodium silicate (water glass). During welding, the heat evaporates and dissociates the water, evolving hydrogen gas, which dissolves into the metal. Under stress, the dissolved hydrogen may produce cracks with the potential for catastrophic failure.

In an effort to decrease the possibility of failure, the presently available welding electrodes are baked at 1100° C. to decrease the water in the flux to less than 0.2%. These electrodes can then be used only for a limited time before the fluxes absorb moisture from the air and have to again be baked out.

A problem in addition to that of water absorption by these weld fluxes is their lack of a $CO_2$ generating compound. $CO_2$ aids in operability of the flux by increasing the stability of the arc and by excluding atmospheric contamination, particularly $N_2$, from the metal. Baking at 1100° C. decomposes sources of $CO_2$, such as calcium carbonate, but does not allow diffusion of the calcium into the sodium silicate to form an intimate mixture which is non-hygroscopic.

Another problem with baking the fluxes at 1100° C. to remove moisture is that metallic powders, which may be added to provide alloying of the weld metal, will oxidize during the baking operation. By lowering the necessary baking temperatures or by using less hygroscopic weld fluxes that do not need frequent baking, temperature sensitive alloy powders may be incorporated into the flux, thereby providing flexibility in the design of the fluxes.

Metal powders are added as required for alloying with the various types of metals or steels to be welded. Fluorides may be added to lower the viscosity of the flux at operating temperature thereby altering the fluidity of the molten flux on the steel. Flexibility in choosing the type of metal powders to be added to the flux rather than changing the composition of the steel rod decreases the cost of the welding electrodes.

It is therefore an object of the present invention to provide a welding flux composition which is not hygroscopic.

It is another object of the present invention to provide a welding flux which can be produced and processed at a temperature less than 1000° C. so that compounds of low stability such as carbonate and alloying metal powders may be included.

It is yet a further object of the present invention to provide a flux which can be mixed with a number of different metal powders for alloying with different steels.

It is a still further object of the present invention to provide a binder for both shielded metal arc welding (SMAW) and submerged arc welding (SAW) fluxes.

It is another object of the present invention to provide a binder which yields a material with relatively high fired strength.

SUMMARY OF THE INVENTION

The present invention is a welding flux binder comprising an alkali-alkaline earth silicate, $M_2O \cdot M'O \cdot SiO_2$, where M is lithium, sodium, or potassium or other element in Group I of the Periodic Table and M' is magnesium, calcium or barium, or other element in Group II of the Periodic Table, which is the reaction product of hydrolyzed and polymerized tetraalkylorthosilicate, $Si(OR)_4$, wherein R is $-CH_3$, $-C_2H_5$, or $-C_3H_7$, and metal compounds. This silicate binder which has a homogeneous distribution of the alkali and alkaline earth ions, has several advantages. Tetraalkylorthosilicate reacts chemically with water, and upon gelling, incorporates the metal ions into the binder, thereby providing a homogeneous mixture of the binder components unlike when sodium silicate particles are sintered. Due to the presence of the CaO or MgO, the fired binder is not hygroscopic. By including sources of $K^+$, $Na^+$, or $Li^+$ ions to lower the melting point for viscous sintering of the gel phase, the binder can be prepared at temperatures as low as 400° C., so that compounds which are unstable at higher temperatures, such as carbonate, may be incorporated. The addition of carbonate is useful as a $CO_2$ generating compound. Dopants such as alloy or iron metal powders can also be included in the binder during the gel phase.

DETAILED DESCRIPTION OF THE PREFERRED EMBODIMENT

The preferred embodiment of the present invention is an alkali metal-alkaline earth-calcium silicate bound weld flux formed of an oxide-based material, the reaction product of hydrolyzed and polymerized tetraethylorthosilicate, $Si(OC_2H_5)_4$, and metal compounds such as carbonates and nitrates. The tetraethylorthosilicate is reacted by first dissolving the $Si(OC_2H_5)_4$ in alcohol and adding acidified water to hydrolyze the tetraethylorthosilicate. Sources of the alkali and alkaline earth metals are then dissolved in the solution. Metal carbonates, fluorides, flux, and other solids are added to make a suspension of 10–50% solids. The suspension is neutralized and cast into a mold. The gelled product is fired at 400°–1000° C. The typical slurry formulation is 50% solids with sufficient $Si(OC_2H_5)_4$ to generate 3–10 w/o silicate binder in the final fired product.

Although tetraethylorthosilicate, $Si(OC_2H_5)_4$ is used in the preferred embodiment, other tetraalkylorthosilicates may be used to provide a flux binder with similar properties. For example, $Si(OCH_3)_4$ and $Si(OC_3H_7)_4$ are acceptable substitutes for the tetraethylorthosilicate.

There are a number of materials which may be used in the flux including manganese oxide (MnO), silicon dioxide ($SiO_2$), zirconium oxide ($ZrO_2$), titanium oxide ($TiO_2$), fluorite ($CaF_2$), alumina ($Al_2O_3$), magnesia (MgO), iron oxide (FeO), barium oxide (BaO), and calcia (CaO). A commercially available $MnO$-$SiO_2$ flux is Linde 80 ™, −200 mesh, manufactured by Union Carbide.

During viscous sintering of the gel, the flux particles are fused together. Sintering behavior depends on the chemistry of the gel phase ($K^+$, $Ca^{++}$) and on the physical structure. The gel exists as small particles, approximately 100 Å of silicate "polymer" between the large flux grains and added compound grains. The gel, which contains residual alcohol and water, serves as a "glue" between particles. Upon heating, the alcohol and water are driven out of the gel and the particles fuse together. In the present invention, temperatures of less than 1000° C., and preferably between 500° C. and 800° C., are adequate to sinter the flux.

It is preferable to include in the flux binder an element from Group I of the Periodic Table, such as sodium, potassium or lithium. $Na^+$, $K^+$, and $Li^+$ ions lower the melting point of the binder so that viscous sintering of the gel phase occurs at a relatively low temperature, between 400° C. to 750° C. Compounds soluble in alcohol, such as nitrates, iodides, salicylates, and carbonates, are the preferred sources of the alkali and alkaline earth ions. The role of the $Ca^{++}$ ions in the reaction product is to make the glass insoluble in water and chemically resistant by "blocking" the structure and suppressing diffusive processes. This same process makes consumer glass products such as bottles and windows chemically stable.

Other solids may be added to the flux material and binder. For example, any powder which is insoluble in alcohol, such as reactive metals including iron, manganese, chromium, nickel, aluminum, titanium, vanadium, niobium, or boron or compounds thereof may be added to the flux formulation. Dopants, substances which dissolve in the solution, may be added to the gel phase during the hydrolysis and polymerization of the tetraethylorthosilicate.

The invention will be further understood from the series of experiments, described in the following non-limiting examples, performed to determine the order of addition of the various components of the flux, to optimize relative ratios of components of the flux, and to compare the properties of the final fired products.

Two basic formulations were investigated using the same fundamental procedures. The first consisted of Linde 80 ™ ($MnO$-$SiO_2$ glass) −200 mesh, $CaCO_3$, $Si(OC_2H_5)_4$, ethanol, hydrochloric acid and water and was used in examples 1–4. The second formulation also contained $K_2CO_3$ and was used in example 5. All percent is weight percent unless otherwise noted.

EXAMPLE 1

Flux and $CaCO_3$ were weighed and mixed. $Si(OC_2H_5)_4$ was dissolved in ethanol and allowed to react for approximately 1 min. The solids, $Si(OC_2H_5)_4$, and water were mixed to produce a suspension containing 50% solids and 5–10 w/o flux binder in the final product. The mixture was cast in a mold, then fired at 750° C. for 6 hours.

EXAMPLE 2

Flux and $CaCO_3$ were weighed and mixed. $Si(OC_2H_5)_4$ was dissolved in ethanol. HCl was added dropwise to water and then mixed with the $Si(OC_2H_5)_4$ in alcohol. The mixture was allowed to react for approximately 1 min. The $Si(OC_2H_5)_4$ solution was then mixed with the flux and $CaCO_3$ to produce a suspension containing 50% solids and 5–10 w/o silicate. The mixture was cast in a mold, then fired at 750° C. for 6 hours.

EXAMPLE 3

$Si(OC_2H_5)_4$ was dissolved in ethanol. HCl was dropwise added to water, then mixed with the $Si(OC_2H_5)_4$-alcohol solution and allowed to react for approximately 1 min. $CaCO_3$ was then added to the alcohol solution to neutralize the acid prior to adding the solid mixture of flux and $CaCO_3$. Two preparations were made, one containing 5 w/o silicate and the other containing 7.5 w/o silicate in the final product. The mixtures were cast in molds, then fired at 750° C. for 6 hours.

EXAMPLE 4

The same procedure used in Example 3 was used in Example 4. $Si(OC_2H_5)_4$ was dissolved in ethanol. HCl was dropwise added to water, then mixed with the $Si(OC_2H_5)_4$-alcohol solution and allowed to react approximately one minute. $CaCO_3$ was added to the alcohol solution to neutralize the acid prior to adding the solid mixture of flux and $CaCO_3$. The $Si(OC_2H_5)_4$ was added to yield 8 w/o silicate in the final product. The mixture was cast in a mold, then fired more than 24 hours at 750° C.

EXAMPLE 5

$Si(OC_2H_5)_4$ was dissolved in ethanol. Acidified water was added to the $Si(OC_2H_5)_4$ solution and allowed to react for approximately 1 min. The water concentration was then increased and $CaCO_3$ and $K_2CO_3$ were added to partially neutralize the acid. Flux, $K_2CO_3$, and $CaCO_3$ were added to make a suspension containing a concentration of 50% solids. The mixture was cast in a mold, then fired at 800° C. for 3 hours.

The products of these experiments were compared by a water test, green strength, and fired strength. The water test is a glycerine bubble test which simulates an actual welding situation. A hole is drilled in the flux sample and an arc is struck through this hole onto a small piece of steel. The sample is quenched in water, the slag is removed and the steel is then placed in glycerine. The presence or absence of a bubble stream of hydrogen is noted. Although somewhat simple, this test will usually react positively to properly dried electrodes, indicating even small amounts of hydrogen. The absence of bubbles means there is less than or equal to 0.1 w/o $H_2O$.

Green strength is a qualitative test. "No strength" means the material is easy to crumble by hand. "Moderate strength" means the material can be broken into small pieces with some difficulty. "High strength" means that the material cannot be broken with reasonable force.

Low fired strength means the sintered material is not too difficult to break. High fired strength means the material cannot be broken by hand and is able to withstand impact.

It is desirable for the flux used on welding rods to be able to withstand some impact in order to facilitate ease of shipping and handling.

RESULTS

There was no polymerization or bonding in Example 1.

In Example 2, there was low green strength and little or almost no fired strength. There was no evidence of hydrogen bubbles in the water test.

Example 3 also showed low green strength and little or almost no fired strength. No hydrogen bubbles were present in the water test.

In example 4, there was some green strength and low fired strength. Both the 5 w/o and 8 w/o silicate containing samples prepared from a suspension of 40% solids and the 5 w/o silicate-containing sample prepared from a suspension of 50% solids were castable. The sample with 8 w/o silicate prepared from a suspension of 50% solids was not castable. None of the samples showed any evidence of hydrogen bubbles.

The mixture in Example 5 rapidly formed hard green pieces. The fired samples had considerable strength. There was no evidence of hydrogen bubbles.

The following conclusions can be drawn from these results.

As shown by the examples, acid must be added to the $Si(OC_2H_5)_4$ alcohol solution to promote crosslinking and gel formation. Although HCl was used in the examples, any strong acid may be used. Nitric acid is the preferred acid since HCl may evolve chlorine which can form phosgene gas during arc welding. $H_2SO_4$ is also not preferred since it may cause some trace sulfur contamination of the steel or metal being welded.

The amount of water present in the samples prepared from a suspension containing 50% solids as in Examples 1-4 is probably too low to allow adequate hydrolysis and polymerization of the $Si(OC_2H_5)_4$. The water level in Example 5 showed better results. The preferred molar ratio of water to $Si(OC_2H_5)_4$ is between 4 and 10, although a broader range is possible.

The relative insolubility in acidic alcohol of $K_2CO_3$, the $CO_2$ source in the flux, and the thermal stability it provides, allows greater flexibility of polymerization kinetics and processing techniques. The results showed that potassium ions were necessary to lower the melting point for viscous sintering at the relatively low temperature of 500°-750° C.

$CaCO_3$ is not effective as a $CO_2$ source since it is soluble in the acidic solution. It is useful in partially neutralizing the acid solution, which is necessary for gellation of the silicate binder.

As shown in Example 5, acid neutralization causes rapid conversion of the suspension to a gel (solid). Complete neutralization of the acid may result in rapid, uncontrolled gellation of the solid suspension, however. Since this would not be desirable in a welding rod manufacturing process, the best way to control gellation would be to partially neutralize the acid, cast the welding flux by dipping the metal rod into the suspension, then expose the rod to an ammonia or base environment (solution or gas) to complete the gellation. The advantages of partial neutralization of the acid and gellation are that the suspension will remain stable for days without undergoing "self-gellation", and that the gellation process occurs in a very controlled fashion.

In summary, a welding flux binder formed by sol-gel chemistry which produces a moisture resistant oxide by decomposition of the gel is disclosed.

The improved flux binder comprises an alkali-alkaline earth silicate hydrolyzed and polymerized from tetraalkylorthosilicate, $Si(OR_4)$, wherein R is $-CH_3$, $-C_2H_5$, or $-C_3H_7$, and alkali and alkaline earth salts. The general formula for the binder is $M_2O.M'O.SiO_2$, where M is preferably lithium, sodium, or potassium and M' is preferably magnesium or calcium. When the binder is used in a mixture with an oxide-based material, preferably of small particle size, the product is a flux that is not hygroscopic, that has a low melting point for viscous sintering, and which is flexible enough to allow incorporation of carbonates, metal powders or other compounds with low thermal stability for improved flux properties and broader applicability in welding of various metals.

The flux is prepared by acid hydrolysis and polymerization of $Si(OC_2H_5)_4$ dissolved in alcohol and partially neutralized by the addition of a basic compound such as calcium carbonate, to which $K^+$, $Na^+$, or $Li^+$ ions and other metal powders or compounds are added. The flux is cast and fired at temperatures between 400° and 1000° C., preferably 500°-750° C.

The preferred embodiment of the binder is prepared from a suspension containing 40-60% solids consisting of $CaCO_3$, $K_2CO_3$ and other solids such as metals and fluorides and 5-8 w/o silicate in the final product. The preferred process is: dissolution of $Si(OC_2H_5)_4$ in an alcohol such as ethanol, methanol, or propanol; dilution of a strong acid such as nitric acid in water; mixing of the $Si(OC_2H_5)_4$-alcohol solution with the diluted acid; addition of $CaCO_3$, alkaline earth and alkali salts and other dopants and solids to the $Si(OC_2H_5)_4$ solution to form a suspension with 40-60% solids; neutralization of the acid to cause gel formation, and firing at 400° C.-1000° C., preferably 500°-750° C.

Although this invention has been described with reference to specific embodiments, it is understood that modifications and variations may occur to those skilled in the art. It is intended that all such modifications and variations be included within the scope of the appended claims.

What is claimed is:
1. A process for making a welding flux comprising:
   a. dissolving tetraalkylorthosilicate in alcohol;

b. diluting a strong acid in water;
c. reacting the tetraalkylorthosilicate and acid solutions;
d. adding at least one alkali compound;
e. adding at least one alkaline earth compound;
f. adjusting the solids content of the suspension of step (e) to 40–60% solids;
g. neutralizing the acid to cause gel formation; and
h. firing the 40–60% solids suspension at a temperature between 400° C. and 1000° C. for between six and 24 hours.

2. The process of claim 1 further comprising the step of casting the suspension in a mold prior to the gel formation step (g).

3. The process of claim 1 further comprising the step of dipping a welding rod into the suspension prior to the gel formation step (g).

4. The process of claim 3 wherein step (g) comprises exposing the dipped welding rod to a basic environment.

5. The process of claim 1 wherein the alkaline earth compound of step (e) is selected from the group consisting of the nitrate, iodide, salicylate, and carbonate of an element selected from the group consisting of calcium, magnesium, and barium.

6. The process of claim 1 wherein the alkali compound of step (d) is selected from the group consisting of the nitrate, iodide, salicylate, and carbonate of an element in Group I of the Periodic Table.

* * * * *